United States Patent Office 3,420,737
Patented Jan. 7, 1969

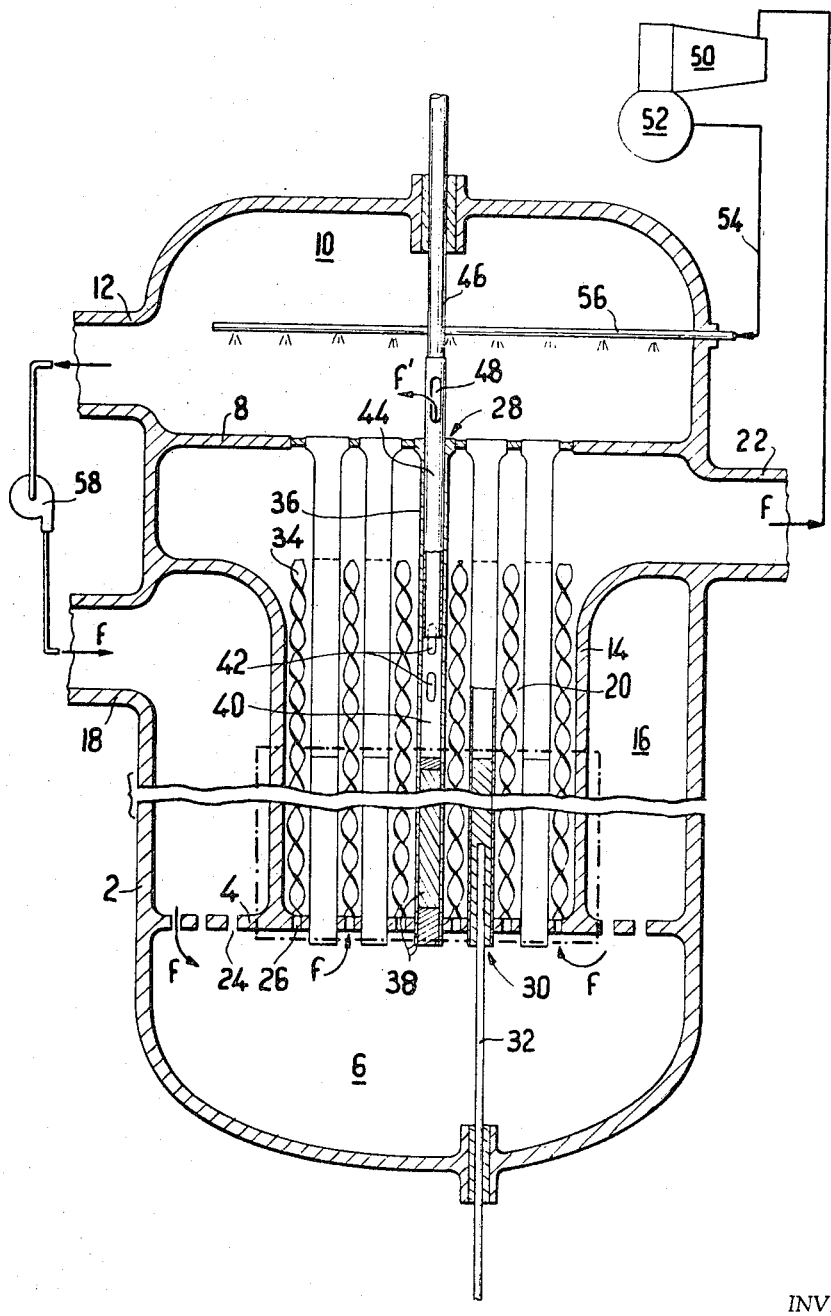

3,420,737
BOILING LIQUID REACTOR
Raymond H. F. Marchal, Paris, and Claude D. Fouré, Courbevoie, France, assignors to Societe Nationale d'Etude et de Construction de Moteurs d'Aviation, Paris, France
Continuation of application Ser. No. 400,979, Oct. 2, 1964. This application Dec. 6, 1966, Ser. No. 599,651
Claims priority, application France, Oct. 4, 1963, 949,605
U.S. Cl. 176—56       3 Claims
Int. Cl. G21c *19/28;* G21c *15/00*

ABSTRACT OF THE DISCLOSURE

For correct operation under low and/or variable gravity conditions a boiling water reactor comprises twisted strips between the fuel elements for directing the water-steam flow in a plurality of adjacent helical streams maintaining a water film against the fuel elements and a phase collection system located downstream of the core and out of the neutronic portion of the reactor.

---

This application is a continuation of our earlier application Ser. No. 400,979, filed Oct. 2, 1964, now abandoned.

The present invention relates to a boiling liquid reactor for a movable installation or, more generally, for an installation which is subjected to an acceleration which is variable and/or capable of assuming a value which is distinctly lower than that of normal acceleration due to gravity.

This case arises in particular in installations which are designed for marine propulsion and which are subjected not only to the action of gravity but also to acceleration effects which are due to the motion of the ship, and also in those installations which are intended for spatial applications involving in certain instances operation in a state either of weightlessness or reduced gravity.

The modifications of resultant forces compared with a stationary ground installation are accompanied by disturbances in the operation of the reactor. Unstable conditions of all kinds are to be expected and are liable to result in neutron flux disturbances and thus to give rise to serious consequences.

In boiling water reactors of the type which are at present in operation, vaporization takes place in contact with fuel elements which usually assume the shape of elongated bodies, said fuel elements being disposed vertically in order to facilitate the evolution of steam which is formed near the top and also in order to ensure a uniform distribution of the water and steam in contact with the fuel elements. This mode of operation makes it necessary to ensure that the acceleration to which the reactor is subjected should remain substantially vertical, or more precisely invariable with respect to the fuel elements, and of sufficient intensity. If the reactor is employed for the purpose of marine propulsion, the accelerations which result from rolling and pitching motion impair the uniformity of distribution; preferential creeping of steam is liable to arise between the fuel elements and to produce local destruction by burnout.

Aside from the direct consequences produced by such disturbances on heat transfer processes and on the operation of devices which are occupied by a number of phases (especially water-steam separators), these disturbances have an incidence on the neutron flux which can even lead to instability of the reactor.

A boiling liquid reactor has already been proposed which is capable of operating even if it is inclined to the vertical and which is therefore designed to tolerate the listing of a ship by directing the general flow in a series of helical streams wherein the liquid phase is discharged to the periphery; this arrangement makes it possible to dispense with the sharply defined horizontal free surface of boiling liquid reactors and makes the operation of the reactor possible in principle even when this latter has a certain angle of inclination.

This arrangement alone, however, is not sufficient to guarantee satisfactory performance of the reactor when this latter is subjected to high transverse accelerations relative to the component in the general direction of flow.

The object of the present invention is to overcome the above-mentioned defects by means of a reactor design wherein the flow of liquid is continuously subjected to inertia forces which are of a sufficiently high order to play a preponderant part in directing the flow and consequently to reduce the influence of external forces to a minimum. In the case of a marine propulsion installation, for example, the aforesaid inertia forces must have a value several times greater than the amplitude of the variable component of the external force in order to achieve this result.

To this end, the invention proposes a boiling liquid reactor for an installation which is subjected to a variable acceleration and/or an acceleration which can assume a value below that of normal gravitational acceleration, comprising a core which is made up of nuclear fuel elements disposed within a vessel in which said liquid circulates, an associated circulation system for utilization of the steam which is generated and for returning the condensed liquid to the vessel, deflector members for directing the circulation of liquid within the vessel between said fuel elements into one or a number of streams having a helical flow pattern, and means for forced circulation of the liquid through said vessel and through said circulation system at a velocity such that the centrifugal acceleration within the stream or within each stream is at least equal to twice the amplitude of the variable component of the acceleration to which the installation is subjected and at least equal to normal acceleration due to gravity.

A reactor of this type is relieved of any danger of nuclear instability which, amongst other reasons, has hitherto excluded boiling water reactors from the field of marine propulsion.

In one advantageous mode of practical application of the invention, the devices which separate the steam generated by the boiling liquid are mounted outside the neutron region of the reactor, that is to say outside that zone in which any modification in proportions and mass of the phases present would have an incidence on the neutron flux characteristics of the reactor.

The members for directing the flow can be of the type described in French certificate of addition No. 76,546 in the name of S.N.E.C.M.A.

If, in particular, the deflector members consist of strips which are twisted around an axis which is parallel to the direction of flow, the following relation must be respected on order that the rotational flow component should ensure an acceleration equal to $G$ times the acceleration $g$ due to gravity G being chosen so as to meet the criteria hereinabove defined):

$$V \geq \frac{n}{2\pi}\sqrt{Cgr}$$

wherein
V is the velocity of circulation of the fluid along the axis of the strip;
r is the mean radius of the fluid stream which is flowing around the strip:
$n \times r$ is the pitch of the helically-twisted strip.

Since the values $\pi$ and $\sqrt{g}$ are of the same order, this formula can be written in the simplified form $$V \geq \frac{n}{2}\sqrt{Gr}$$

A better understanding of the invention will be obtained from a perusal of the description which follows below in connection with one form of embodiment which is given by way of example and not in any limiting sense. Reference is made in the description to the accompanying drawings, the single figure of which shows diagrammatically a nuclear reactor in accordance with the invention, as represented in cross-section on a plane which passes through the axis.

The nuclear reactor which is illustrated in the drawings comprises a pressure vessel 2 designed to withstand the pressure of the vaporizable fluid which circulates in the flow path shown diagrammatically by the arrows $f$.

The above-mentioned pressure vessel is divided by means of partition walls into a series of compartments, namely, a transverse partition wall 4 which forms at the bottom of the tank a distributor compartment 6; another transverse partition wall 8 which forms together with the top wall of the pressure vessel a compartment 10 for collecting the liquid phase, which is provided with an outlet duct 12. Finally, a central cylindrical partition wall 14 provides a separation within the central portion of the vessel between an annular admission chamber 16 which is provided with an inlet duct 18 and a central chamber 20 which is occupied by the reactor core and which is provided at the top portion thereof with a steam outlet duct 22. The admission compartment 16 is designed to communicate with the distributor 6 through a series of openings 24 formed in the peripheral portion of the partition wall 4.

The central portion of the partition wall 4 constitutes a grid in which are formed apertures 26 permitting the fluid in liquid phase to flow from the distributor to the central chamber 20 and apertures which are designed to serve as guides for fuel element cells such as the cell 28.

The central portion of the top partition wall 8 also constitutes a grid from which the fuel element cells 28 are suspended with interposition of a sealing joint so as to pass through the internal chamber while the lower extremities of said fuel element cells are fitted within the apertures of the partition wall 4. The fuel element cells referred to are located at the nodes of a uniform lattice which may be either of square pitch or hexagonal centered pitch, for example.

A certain number of the nodes of the lattice, however, are not occupied by fuel element cells but by control element assemblies such as the control unit 30 each consisting of a neutron-absorbing element whose position within the reactor core is regulated from the exterior of the pressure vessel by means of a rod 32 which traverses the reactor shell through a leak-tight gland.

Provision is made between the fuel element cells 28 for helically twisted strips such as the strip 34 which are designed to direct the flow of primary fluid within the chamber 20 in a series of streams having a helical flow pattern. It will be apparent that the pitch of said strips is determined as a function of the flow velocity so as to satisfy the first condition hereinabove set forth, as will be explained below.

Each fuel element cell 28 consists of a tube 36 which is closed at the upper extremity thereof and the lower extremity of which is occupied by a fuel cartridge 38 which constitutes the source of heat. The lateral wall of the tube 36 is pierced with a series of slots 42 which are spaced at intervals in the direction of the length of said tube and which are intended to collect the vapor phase remaining in the fluid.

The separator device referred to, which will be described in greater detail hereinafter, could be replaced by a conventional device (cyclone separator, for example). However, whatever arrangement may be employed, said device is placed outside the reactor core, which is defined as the zone in which any variations in neutron-flux characteristics (adsorption, moderation, etc.), have an appreciable incidence on the operation of the reactor. For the sake of greater clarity, this zone is diagrammatically delimited in chain-dotted lines in the figure.

The device which is illustrated comprises a liner tube 44 which is slidably mounted within each tube 36 (only one liner tube being shown in the figure for the sake of greater simplicity) and movable from the exterior of the reactor by means of a rod 46. Said liner tube serves to obturate the slots 42 to a greater or lesser extent. The upper portion of the liner tube is provided with wide openings such as the opening 48 through which is discharged into the compartment 10 the liquid which is projected into the tube 36 through the openings 42 as a result of the centrifugal force produced by the helical flow motion of the fluid streams.

There is added to the assembly which has just been described an external circulation system for the utilization of the steam and for the forced circulation of the fluid. The circulation system which is shown diagrammatically in the figure consists of a turbine 50 in which the steam derived from the outlet duct 22 expands, a condenser 52 in which the steam condenses and a pipe 54 for returning the condensed liquid to a distributor-pipe 56 for injecting the condensed liquid into the compartment 10. Feed pumps 58 suck the liquid from compartment 10 and inject said liquid into the chamber 16 through the inlet duct 18. The liquid is preferably supercooled within the condenser, that is to say brought to a heat content which is lower than that which corresponds to the liquid-steam equilibrium at the pressure which is considered.

The operation of the reactor is apparent from the foregoing description: the vaporizable fluid which is admitted in liquid phase through the inlet duct 18 flows into the annular chamber 16 and the distributor 6. The fluid then flows from said distributor through the apertures 26 into the chamber 20 in which the helically twisted strips direct the circulation of fluid in a series of streams having a helical flow pattern. The pumps 58 must impart to the liquid a flow velocity which is such that the component of rotational motion of each stream satisfies the first condition hereinbefore set forth independently of the other conditions to be fulfilled, especially with a view to ensuring satisfactory cooling of the fuel elements.

The partially vaporized fluid reaches the level of the slots 42 through which the liquid which has not yet been vaporized escapes towards the compartment 10 for collecting the liquid (in the direction of the arrow $f'$). The positions of the liner tubes 44 are obviously regulated so as to reduce to a minimum the quantity of steam which penetrates into the tubes 36 through the slots 42.

It will be apparent that the invention is not limited in any sense to the mode of practical application which has been described and illustrated by way of example and it must be understood that the scope of this invention extends, on the contrary, to all alternative forms.

We claim:
1. A boiling water coolant reactor for operation in an installation subjected to the earth's gravity field and to a variable acceleration, comprising: a pressure vessel; a core having a plurality of nuclear fuel elements disposed in parallel relation to each other within the pressure vessel at the nodes of a regular lattice; a coolant loop for utilizing the coolant steam generated by said core, for condensing said steam and returning the condensed liquid coolant to the pressure vessel; means for circulating the coolant through said pressure vessel and through said loop; twisted strips located between said fuel elements and extending the full length of said core for directing the circulation of the coolant through said pressure vessel between said fuel elements in a plurality of parallel streams having a helical flow pattern, said circulating means circulating the coolant at such a speed relative to the degree of twist of said strips that the centrifugal acceleration in each stream produced by said twisted strips is at least equal to twice the amplitude of the variable component of acceleration to which the installation is subjected whereby said helical flow pattern is divided into an inner steam flow and an outer liquid flow in direct contact with each other, said liquid flow sweeping said fuel elements; and a collecting device for collecting the coolant liquid and the coolant steam into separated bodies, said collecting device being located in said vessel outside and downstream of the reactor core.

2. A boiling water coolant reactor for operation in an installation in an acceleration field having a lower than normal intensity comprising: a pressure vessel; a core having a plurality of nuclear fuel elements disposed in parallel relation to each other within the pressure vessel at the nodes of a regular lattice; a coolant loop for utilizing the coolant steam generated by said core, for condensing said steam and returning the condensed liquid coolant to the pressure vessel; means for circulating the coolant through said pressure vessel and through said loop; twisted strips located between said fuel elements and extending the full length of said core for directing the circulation of the coolant through said pressure vessel between said fuel elements in a plurality of parallel streams having a helical flow pattern, said circulating means circulating the coolant at such a speed relative to the degree of twist of said strips that the centrifugal acceleration in each stream induced by said twisted strips is at least equal to the normal gravity acceleration on earth whereby said helical flow pattern is divided into an inner steam flow and an outer liquid flow in direct contact with each other, said liquid flow sweeping said fuel elements; and a collecting device for collecting the coolant liquid and the coolant steam into separate bodies, said collecting device being located in said vessel outside and downstream of the reactor core.

3. A reactor as defined in claim 1 wherein said device for collecting the coolant liquid and said steam comprises portions of said twisted strips extending downstream from said core.

References Cited
UNITED STATES PATENTS

| | | | |
|---|---|---|---|
| 3,034,975 | 5/1962 | Beurtheret | 176—55 |
| 3,041,264 | 6/1962 | Ricard | 176—54 |
| 3,063,925 | 11/1962 | Huet | 176—54 |
| 3,144,393 | 8/1964 | Raber et al. | 176—54 |
| 3,156,626 | 11/1964 | Huet | 176—54 |
| 3,185,630 | 5/1965 | Ammon | 176—55 |
| 3,253,999 | 5/1966 | Weisman. | |

FOREIGN PATENTS 1,300,662  6/1962  France.

BENJAMIN R. PADGETT, *Primary Examiner.*

MELVIN J. SCOLNICK, *Assistant Examiner.*

U.S. Cl. X.R.

176—61